United States Patent [19]

Brusson et al.

[11] Patent Number: 5,298,582
[45] Date of Patent: Mar. 29, 1994

[54] EXTRUDABLE/COATABLE ETHYLENE (CO)POLYMERS

[75] Inventors: Michel Brusson, Lambersart; Jean Lebez, Lens, both of France

[73] Assignee: Atochem, Puteaux, France

[21] Appl. No.: 105,660

[22] Filed: Aug. 13, 1993

Related U.S. Application Data

[63] Continuation of Ser. No. 682,372, Apr. 9, 1991.

[30] Foreign Application Priority Data

Apr. 9, 1990 [FR] France .................. 90 04504

[51] Int. Cl.$^5$ .................. C08F 222/40; C08F 222/04; C08F 224/00; C08F 220/10; C08F 110/02
[52] U.S. Cl. .................. 526/262; 526/272; 526/273; 526/323.2; 526/352.2
[58] Field of Search .................. 526/324, 89, 348.8, 526/262, 272, 273, 323.2, 352.2

[56] References Cited

U.S. PATENT DOCUMENTS 4,088,811  5/1978  Harris et al. .................. 526/89

FOREIGN PATENT DOCUMENTS 0175318  3/1986  European Pat. Off. .

Primary Examiner—Joseph L. Schofer
Assistant Examiner—Wu C. Cheng
Attorney, Agent, or Firm—Burns, Doane, Swecker & Mathis

[57] ABSTRACT

Improvedly extrudable/coatable ethylene (co)polymers, well adopted for the production of film-coated metal composites, are prepared by radical polymerizing ethylene or recipe thereof including at least one ester of an unsaturated carboxylic acid, e.g., (meth)acrylic acid, advantageously under a pressure ranging from about 800 to 2,500 bars and at a temperature ranging from about 140° to 280° C., in the presence of an effective chain-transfer amount of at least one unconjugated diene, e.g., hexa-1,5-diene, deca-1,9-diene or 2-methylocta-1,7-diene.

16 Claims, No Drawings

EXTRUDABLE/COATABLE ETHYLENE (CO)POLYMERS

This application is a continuation, of application Ser. No. 07/682,372, filed Apr. 9, 1991 pending.

BACKGROUND OF THE INVENTION

1. Field of the Invention

The present invention relates to an improved free radical (co)polymerization of ethylene, and, more especially, to the preparation of copolymers of ethylene and at least one ester of acrylic or methacrylic acid; the final polymers are particularly well adopted for the coating of metal substrates.

2. Description of the Prior Art

Among the ethylene polymers and copolymers prepared by a free radical route, those having a fluidity index ranging from about 3 to 10 dg/min are well known to be particularly suitable for the deposition of thin film coatings having a thickness ranging from 10 to 500 μm. For such application, two properties are essential to provide a suitable polymer or copolymers. These are the industrial drawing rate thereof, on the one hand, and the "neck-in" on the other. By "neck-in" is intended the contraction in width thereof, defined by the ratio.

[(width of the die)−(width of the film)]/(width of the die).

The known processes for the free radical polymerization of ethylene are typically processes which are carried out under high pressure. In this type of process a chain-transfer agent is sometimes employed, generally hydrogen, butane, propane or a lightweight α-olefin, such as propene or but-1-ene. In the copolymerization of ethylene with at least one ester of acrylic or methacrylic acid, an alkane, an olefin, an aldehyde or a ketone may also be used as the chain-transfer agent.

In the known processes, such as, in particular, those described in EP-A 174,244 and EP-A 177,378, however, it is not possible to attain drawability and "neck-in" levels which universally permit the use of the final copolymers for all coating applications.

SUMMARY OF THE INVENTION

Accordingly, a major object of the present invention is the provision of an improved process for the polymerization or copolymerization of ethylene to improve the drawability and/or the "neck-in" of the polymer or copolymer obtained and consequently to extend the range of applicability of such polymer or copolymer in a wide variety of coating techniques.

Briefly, the present invention features the free radical polymerization or copolymerization of ethylene in the presence of a chain-transfer agent comprising at least one unconjugated diene, preferably an unconjugated diene having a long backbone chain, such as hexa-1,5-diene.

Indeed, it has now surprisingly been found that conducting the above polymerization in the presence of an effective amount of such chain-transfer agent provides a substantial reduction in the "neck-in" and a considerable increase in the drawability of the final polymer, more particularly in the case of the copolymers of ethylene and at least one ester of acrylic or methacrylic acid.

DETAILED DESCRIPTION OF THE PREFERRED EMBODIMENTS OF THE INVENTION

More particularly according to the present invention, ethylene is polymerized, or copolymerized with at least one ester of acrylic or methacrylic acid, in the presence of at least one free radical initiator, under a pressure ranging from about 800 to 2,500 bars and at a temperature ranging from 140° C. to 280° C., such (co)polymerization being carried out in the presence of an effective amount of at least one unconjugated diene.

In accordance with this invention, by "an effective amount of unconjugated diene" is intended an amount advantageously ranging from about 0.05% to 1% by weight relative to the monomer system subjected to polymerization. A proportion of unconjugated diene of higher than approximately 1% by weight is generally not necessary to obtain the effect desired by the present invention, whereas a proportion of less than approximately 0.05% by weight will generally not permit a sufficiently adequate result to be obtained. In order to control the fluidity index of the polymer or copolymer within a range corresponding to the intended applications by coating techniques, namely, from about 3 to 10 dg/min, it is generally preferable to use from about 0.1% to 0.4% by weight of unconjugated diene.

Among the unconjugated dienes suitable for use according to the present invention, preferred are those having a long chain backbone, i.e., comprising at least six carbon atoms, such as hexa-1,5-diene, deca-1,9-diene and 2-methylocta-1,7-diene. Although the consequence of this preferred embodiment is generally to limit the desirable effect provided by the use of the unconjugated diene, the latter may be used in the presence of another conventional transfer agent for this type of polymerization, such as hydrogen, propane, butane, propene or but-1-ene.

The process according to the invention is advantageously carried out in the following manner: the polymerization apparatus comprises a compressor, designated the primary compressor, connected to a secondary compressor which is itself connected directly to a reactor into which fresh ethylene is introduced into the inlet of the said primary compressor. The reactor, which may be of tube or autoclave type and may comprise one or more zones, is fitted with a reduction valve enabling the pressure to be lowered to a valve ranging from about 150 to 300 bars. The mixtures of molten polymer and unreacted monomer or monomers is transferred through the reduction valve and is fed to a separator operating under medium pressure. The polymer is collected at the bottom of the separator while the unreacted monomer or monomers is or are recycled, after cooling and settling/separation of the polymers of low molecular weight (less than or equal to 5,000) which they contain, at the inlet of the secondary compressor. The bottom of the separator, operating under medium pressure, may be fitted with a reduction valve connected to a funnel operating under low pressure (a few bars), at the bottom of which the polymer is collected, the gases exiting the funnel being recycled to the inlet of the primary compressor. The backflow pressure of the secondary compressor is, of course, equal to the pressure in the reactor, except for pressure drops.

According to the process of the invention, the unconjugated diene is injected into the inlet of the primary compressor and/or of the secondary compressor.

When the process according to the invention is used for the production of ethylene copolymers, the comonomer(s) other than ethylene, in particular the ester of acrylic or methacrylic acid, may be introduced directly into the polymerization reactor, as described, for example, in EP-A 177,378. The comonomer(s) other than ethylene, in particular the ester of acrylic or methacrylic acid, may also be introduced into the reactor via the inlet of the secondary compressor, as described, for example, in EP-A 177,378.

The process according to the invention permits the preparation of ethylene copolymers having a fluidity index ranging from about 3 to 10 dg/min and displaying a low width contraction ("neck-in") and a good drawability, the following being exemplary thereof:

ethylene/unsaturated carboxylic acid ester copolymers, the acid preferably being ethylenically unsaturated adjacent to the carboxyl group. The unsaturated acid is preferably a monocarboxylic acid such as acrylic acid, methacrylic acid, crotonic acid or cinnamic acid. It may also be a diacid, such as maleic acid, fumaric acid, citraconic acid, glutaconic acid or muconic acid. In the case of the diacids, the unsaturated acid ester may be a monoester or, preferably, a diester. The alcohol from which the unsaturated acid ester is derived preferably has from 1 to 8 carbon atoms. The esterifying group may be straight or branched chain, such as, for example, methyl, ethyl, n-propyl, isopropyl, n-butyl, isobutyl, tert-butyl, isoamyl, n-hexyl, 2-ethylhexyl or isooctyl. In addition to the recurring structural units derived from ethylene and those derived from the unsaturated acid ester, copolymers of this type may contain units derived:

(a) from an unsaturated dicarboxylic acid anhydride, with said units being present in a proportion of up to about 3 mol % in the copolymer. The anhydride is advantageously selected from among citraconic anhydride, itaconic anhydride, tetrahydrophthalic anhydride and, preferably, maleic anhydride;

(b) from an unsaturated glycidyl monomer, with said units being present in a proportion of up to about 18 mol % in the copolymer. The glycidyl monomer may be selected, in particular, from among glycidyl methacrylate and glycidyl acrylate, monoglycidyl itaconate and diglycidyl itaconate, monoglycidyl butenetricarboxylate, diglycidyl butenetricarboxylate and triglycidyl butenetricarboxylate;

(c) from an unsaturated dicarboxylic acid N-carboxyalkylimide, with said units being present in a proportion of up to about 3 mol % in the copolymer. A copolymer of this type is prepared by reacting an aminoalkylcarboxylic acid with an ethylene/unsaturated acid ester/unsaturated dicarboxylic acid anhydride terpolymer at a temperature ranging from 150° C. to 300° C.;

(d) from a polyol polyacrylate or polymethacrylate, with said polymers being present in a proportion of up to about 0.4 mol % in the copolymer. By "polyol poly(meth)acrylate" comprising the structure of such copolymers is intended any compound derived from a polyol and containing at least two ester functions obtained by at least partial esterification of said polyol by means of acrylic or methacrylic acid. It may be a (di)methacrylate of a diol, triol, tetrol, etc., a tri(meth)acrylate of a triol, tetrol, etc., or a tetra(meth)acrylate of a polyol having at least 4 alcohol functions. Exemplary such compounds are the diacrylates and dimethacrylates of ethylene glycol, propylene glycol, butane-1,3-diol, butane-1,4-diol, hexane-1,6-diol, neopentylglycol, cyclohexane-1,4-diol, cyclohexane-1,4-dimethanol, 2,2,4-trimethylpentane-1,3-diol, 2-ethyl-2-methylpropane-1,3-diol, 2,2-diethylpropane-1,3-diol, diethylene glycol, dipropylene glycol, triethylene glycol, tripropylene glycol, tetraethylene glycol, tetrapropylene glycol, trimethylolethane, trimethylolpropane, glycerol and pentaerythritol, triacrylates and trimethacrylates of trimethylolethane, trimethylolpropane, glycerol and pentaerythritol, tetraacrylates and tetramethacrylates of pentaerythritol, di(meth)acrylates to hexa(meth)acrylates of dipentaerythritol, poly(meth)acrylates of monoethoxylated or polyethoxylated or monopropoxylated or polypropoxylated polyols, such as triethoxylated trimethylolpropane triacrylate and trimethacrylate or tripropoxylated trimethylolpropane triacrylate and trimethacrylate; tripropoxylated glycerol triacrylate and trimethacrylate; and tetraethoxylated pentaerythritol triacrylate, trimethacrylate, tetracrylate and tetramethacrylate.

In the case of the ethylene/alkyl (meth)acrylate/maleic anhydride terpolymers, the ethylene comonomers may be introduced into the reactor by pumping a solution of maleic anhydride in the alkyl (meth)acrylate under pressure, mixing this solution with the stream of ethylene and homogenizing the mixture (advantageously in apparatus of the Venturi or spiral type) before it is charged into the reactor, as described in FR-A 2,498,609. Introducing the comonomers directly into the reactor, as described in EP-A 174,244, may be carried out in the form of a solution of maleic anhydride in the alkyl (meth)acrylate for anhydride concentrations not exceeding 300 g/l, or in the form of a solution of maleic anhydride and alkyl (meth)acrylate in a solvent such as propylene carbonate or dimethylformamide, for example in a concentration of 50 to 500 g/l.

The free radical initiators which can be used according to the invention are those initiators conventionally used in such high-pressure polymerization processes, such as, for example, 2-ethylhexyl peroxydicarbonate, di-tert-butyl peroxide, tert-butyl perbenzoate, tert-butyl 2-ethylperhexanoate and isopropanoyl peroxide.

More than one initiator may be used simultaneously in a given zone of the reactor.

As is well known to this art, the selection of the initiator or initiators depends on the polymerization temperature.

The present invention also features a composite material comprising at least one layer of metal coated with at least one layer of a film of a polymer or copolymer obtained by the process described above and having a thickness ranging from about 5 to 500 μm.

When the polymer of the film comprising the composite material of the invention is a copolymer comprising recurring structural units derived from an ethylenically unsaturated dicarboxylic acid anhydride, said film may be coated with at least one layer of film of a thermoplastic resin, such as polyethylene, which generally has a thickness ranging from 0.05 to 5 mm and which then constitute the outer layer of the composite material. This outer layer provides a high protection against mechanical damage and the penetration of moisture.

For certain specific applications, the composite material may comprise, between the layer of metal and the layer of polymer film, a layer of resin intended to improve the bonding, comprising, for example, an adhesive thermosetting resin such as an epoxide resin. The epoxide resin, which may be solid or liquid at ambient temperature, is then mixed with a hardener such as, for example, anhydride or polyaminoamide, and, if necessary, a crosslinking catalyst is applied in the liquid form to the layer of metal to be coated, in a thickness which advantageously ranges from 10 to 200 μm.

The process for producing such composite material comprises coating the polymer film onto a metal support, including, if necessary, a layer of resin to enhance the bonding, at a temperature ranging from about 140° to 330° C., with the metal support moving under the coating or extrusion head at a speed of from about 1 to 600 meters per minute. The metal is, for example, aluminum (in this case the speed of the substrate advantageously ranges from about 100 to 600 meters per minute) or steel (in the case of steel tubes, the speed of movement thereof generally ranges from 1 to 10 meters per minute). The metal support is in the form of a plate, sheet or tube and has a thickness of at last 25 μm. The coating is advantageously carried out using a flat die. When the composite material comprises, as an outer layer thereof, a layer of film of thermoplastic resin, the latter layer is advantageously formed by coextrusion employing a second flat die positioned a distance back from the first. The presence, in the polymers according to the invention, of recurring structural units derived from polyol poly(meth)acrylate enables the contraction in width (as defined above) of the coated film to be significantly reduced.

In order to further illustrate the present invention and the advantages thereof, the following specific example is given, it being understood that same is intended only as illustrative and in nowise limitative.

EXAMPLE

A polymerization apparatus was used which comprised, in series, a primary compressor, a secondary compressor, a reactor, a separator, a degassing funnel and an extruder from which the polymer formed was introduced into a granulating apparatus, the gasses issuing from the separator being recycled to the inlet of the secondary compressor and those issuing from the funnel being recycled to the inlet of the primary compressor. In this apparatus, the copolymerization of a flowstream comprising, in a stationary regime, 0.44% by weight of bis(3,5,5-trimethylhexanol) peroxide, 98.46% by weight of ethylene, 0.6% by weight of n-butyl acrylate, 0.3% by weight of maleic anhydride and 0.2% by weight of hexa-1,5-diene (the latter being introduced into the inlet of the primary compressor in the form of a solution in a $C_{12}$–$C_{14}$ aliphatic hydrocarbons cut) was carried out under a pressure of 2000 bars and at a temperature of 200° C. Maleic anhydride was introduced directly into the reactor in the form of a 500 g/l solution in propylene carbonate. n-Butyl acrylate was introduced into the inlet of the secondary compressor.

A copolymer was produced which comprised 92.5% by weight of recurring structural units derived from ethylene, 5% of recurring structural units derived from n-butyl acrylate and 2.5% of recurring structural units derived from maleic anhydride; it had a fluidity index (measured in accordance with ASTM standard D-1238 at 190° C. under a charge of 2.16 kg) of 7.5 dg/min, a mass per unit volume of 0.939 g/cm$^3$, a weight-average molecular weight of 68,000 and a polydispersity index $\overline{M}w/\overline{M}n$ of 4.0.

The drawing force of the copolymer, measured at a drawing rate of 3.14 m/min, was 1.3 gf. The copolymer was then melted at 280° C. and extruded using a flat die 500 mm in width and having an air gap of 0.6 mm. A 37 μm thick aluminum sheet was coated, at a drawing rate of 100 m/min, such as to overlay it with 10 g of polymer per m$^2$. The contraction in width, defined as above, was 14%.

While the invention has been described in the terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of a coatable (co)-polymer of ethylene, comprising radical (co)polymerizing ethylene, or admixture thereof with at least one ester of an unsaturated carboxylic acid, in the presence of an effective chain-transfer amount of at least one unconjugated diene having an acyclic backbone chain.

2. The process as defined by claim 1, carried out in the presence of at least one free radical initiator, under a pressure ranging from about 800 to 2,500 bars and at a temperature ranging from about 140° to 280° C.

3. The process as defined by claim 1, carried out in the presence of from about 0.05% to 1% by weight of said at least one unconjugated diene, relative to the weight of the (co)monomers subjected to (co)polymerization.

4. The process as defined by claim 3, carried out in the presence of from about 0.1% to 0.4% by weight of said at least one unconjugated diene.

5. The process as defined by claim 1, carried out in the presence of an additional chain-transfer agent.

6. The process as defined by claim 5, said additional chain-transfer agent comprising hydrogen, propane, butane, propene or but-1-ene.

7. The process as defined by claim 1, comprising radical homopolymerizing ethylene.

8. The process as defined by claim 1, comprising radical copolymerizing ethylene with at least one ester of an unsaturated carboxylic acid.

9. The process as defined by claim 8, said unsaturated carboxylic acid comprising a mono- or dicarboxylic acid.

10. The process as defined by claim 9, said unsaturated carboxylic acid comprising acrylic or methacrylic acid.

11. The process as defined by claim 8, comprising radical copolymerizing ethylene with at least one alkyl ester of an unsaturated carboxylic acid.

12. The process as defined by claim 8, comprising radical copolymerizing ethylene with at least one ester of an unsaturated carboxylic acid and at least one other comonomer copolymerizable therewith.

13. The process as defined by claim 12, said at least one comonomer comprising an unsaturated dicarboxylic acid anhydride, an unsaturated glycidyl monomer, an N-carboxyalkylimide of an unsaturated dicarboxylic acid or a polyol poly(meth)acrylate.

14. The ethylene (co)polymer product of the process as defined by claim 1.

15. A process for the preparation of a coatable (co)-polymer of ethylene, comprising radical (co)polymerizing ethylene, or admixture thereof with at least one ester of an unsaturated carboxylic acid, in the presence of an effective chain-transfer amount of at least one unconjugated diene having an acyclic backbone chain comprising at least six carbon atoms.

16. A process for the preparation of a coatable (co)-polymer of ethylene, comprising radical (co)polymerizing ethylene, or admixture thereof with at least one ester of an unsaturated carboxylic acid, in the presence of an effective chain-transfer amount of at least one unconjugated diene including hex-1,5-diene; deca-1,9-diene or 2-methylocta-1,7-diene.

* * * * *